June 5, 1934.  C. E. HATHORN  1,961,584
FRAME FOR ACCESS OPENING FOR USE IN AIRCRAFT CONSTRUCTION
Filed April 12, 1932
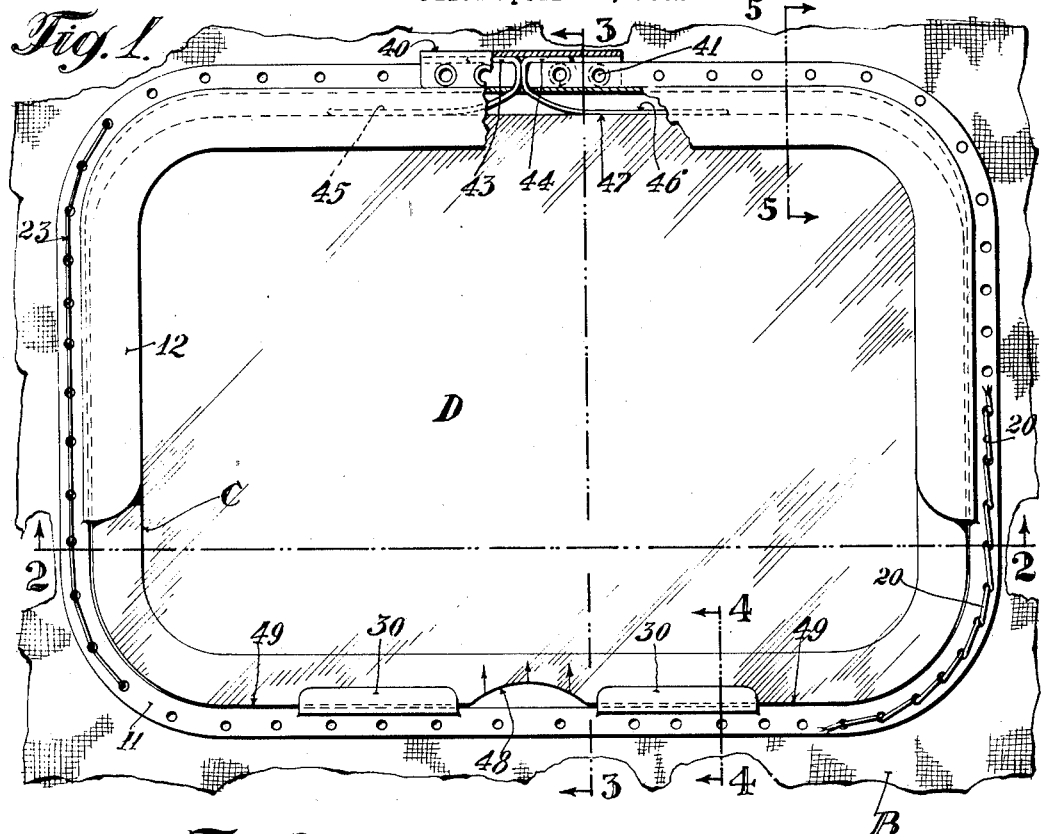
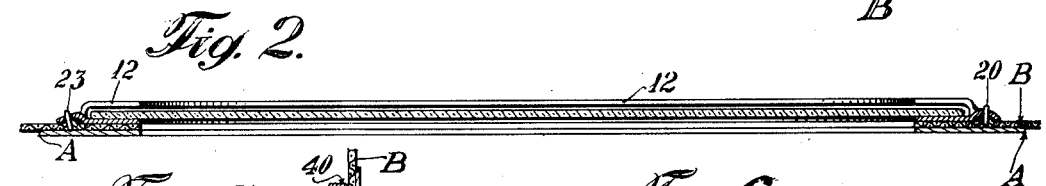
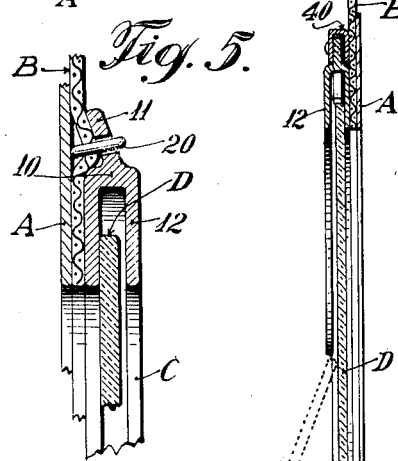
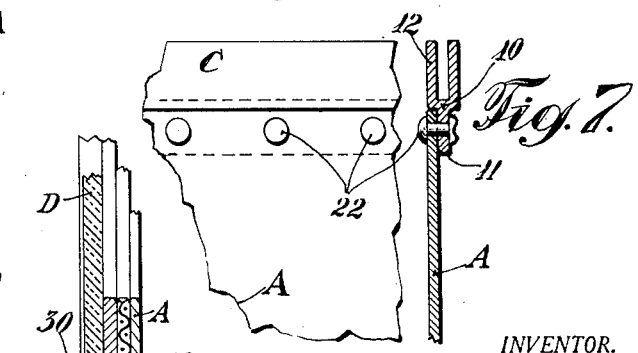
INVENTOR.
Charles E. Hathorn
BY
ATTORNEY.

Patented June 5, 1934

1,961,584

UNITED STATES PATENT OFFICE 1,961,584

FRAME FOR ACCESS OPENING FOR USE IN AIRCRAFT CONSTRUCTION

Charles E. Hathorn, Hempstead, N. Y., assignor to Curtiss Aeroplane & Motor Company, Inc., a corporation of New York Application April 12, 1932, Serial No. 604,707

7 Claims. (Cl. 244—31)

The present invention relates to access openings generally, and more specifically to an improved frame for inspection doors and hand hole openings for use in the construction and operation of aircraft, or other equipment requiring periodical inspection or maintenance of particular localities or parts of the structure.

In previous practice, such frames have been constructed from sheet metal stampings or other material which has required the use of rivets or other fastening devices to secure the separate members together in order to build up the section of the frame, or have consisted of a thin sheet of metal folded over to form a frame having a recess or groove for receiving the door of the inspection opening. In a certain sense, these devices have been operative, but as a rule the same have proven to be unsatisfactory in service, either for the reason that no suitable provision has been made for securing the frame to the covering material of the wing or other body, or because the frames have not had sufficient strength consistent with required lightness of weight to withstand serious deformation and consequent loss of utility under ordinary conditions of service.

It is therefore an object of the present invention to provide an improved frame for such an opening which is rigid enough to meet the practical requirements of service under conditions to which it is subjected.

Another object of the invention is to incorporate in such a structure in connection with the use of my new type of frame, certain other improved features of construction and assembly of my improved frame with respect to the covering material of the airplane wing or other part, and of the mounting and operation of the inspection door with respect to the frame.

It is also an object of the present invention to construct such a frame from a solid piece of light weight metal which may be extruded or otherwise shaped to form a frame section in which the guide members for retaining the door of the opening, and a continuous flange for securing the frame to the covering material of the aircraft wing or other body are integral with each other and with the frame, thereby strengthening and bracing the latter so that it will have an inherent rigidity sufficient to resist deformation and retain its functions throughout the life of the airplane or other structure in connection with which it is used.

A further object of my invention is to provide a frame material for a hand-hole or an inspection opening which is also adaptable for use in long straight or curved sections, for example, as guides for retaining narrow windows or doors at wing hinge joints, or in connection with hand-hole or baggage openings in the sides of the body, or in the wings or engine cowling of an airplane. Since the frame section is formed by extrusion or equivalent process, an additional advantage is obtained in that the guide members as well as the flange for securing the frame to the covering material are made continuous throughout the length of the frame. Therefore, all that is necessary to do to adapt the frame to the different applications suggested is to bend the same to the desired shape and then merely trim off or cut away those portions of the continuous guide members that are not required to retain the door or cover for the opening.

It is also an object of my invention to provide a frame for such an opening which may be sewed to a fabric patch so that when it becomes necessary to repair the covering material, or at times of periodic overhaul and re-covering of the surfaces of the aircraft, the frame may be used repeatedly simply by sewing them to new patches. It is not less important to note that in the present invention the flange of the frame of the type disclosed, when stitched to a fabric patch or covering material, maintains the frame in contact with the fabric so as to form a smooth joint at the edges of the frame which offers a small resistance to air flow over the surface, and that the flange also provides a space for the underside of the sewing thread which allows the patch to which the frame is stitched to be applied smoothly to the wing or other surface as the case may be. A frame of the type disclosed may also be riveted or otherwise secured directly to the edges of, or to the sides of an opening in a metal cowling, or metal wing or fuselage covering, so as to form a flush joint with the material to which it is attached.

Still a further object of my invention resides in the manner of securing the ends of such a frame together so that the fastening device for joining the ends of the frame when used in connection with an opening of moderate size, also provides a mounting for a means for retaining the transparent door or other cover for the opening in closed position relative to the frame, which means is so constructed as to allow the door to be opened or entirely removed and replaced and secured in position by the use of the fingers alone without necessity for an implement of any kind. Although special tools will be necessary to form a frame such as I desire to cover by this patent, it may be manufactured with facility by a simple process more economically than other types now being used, and the advantages to be found in the manner of assembling the frame more than compensate for the cost of the special equipment.

With the above and other objects which will appear from reading the following specification in view, this invention consists of the novel features of construction and arrangement of parts, hereinafter fully described, claimed and illustrated in the accompanying drawing, forming parts of this specification. I desire to have it understood that the specific application of my invention herein shown is by way of example only and although considered to represent an acceptable embodiment thereof, is susceptible of modification as suggested above within the scope of the claims appended hereto.

In the drawing, briefly described as follows, similar characters of reference indicate corresponding parts in all the views:

Fig. 1 is a plan view of my improved frame as applied to an opening of moderate size partially cut away so as to show in cross section the combined means for securing the ends of the frame together and for retaining the door in position relative to the frame.

Fig. 2 shows a sectional view taken in the plane of line 2—2 of Fig. 1.

Fig. 3 is a cross-sectional view taken on line 3—3 of Fig. 1 showing the manner of opening and removing the door of the inspection opening.

Fig. 4 is an enlarged section taken on line 4—4 of Fig. 1 showing in detail the relative position of the frame to the fabric patch to which it is secured and to the covering material of the wing or other body.

Fig. 5 is an enlarged sectional view similar to Fig. 4 taken on line 5—5 of Fig. 1.

Fig. 6 gives a fragmentary view and cross section of the modification referred to wherein the frame is riveted directly to a metal surface covering to form a flush joint therewith.

Fig. 7 is a sectional view of the modification shown in Fig. 6.

Referring more particularly to the drawing, Figs. 1 to 3 thereof show an adaptation of my invention sufficient for the purpose of a complete description of the manner in which my improved frame may be utilized in aircraft construction, while Figs. 4 to 7, inclusive, give a more detailed showing of the frame per se and of the manner of assembling the frame with respect to the other parts of an aircraft.

My improved frame is manufactured in long straight strips for use as a structural material from a solid piece of aluminum, aluminum alloy or other material extruded or formed by an equivalent process to give a rigid section comprising, as best shown in Figs. 5 to 7 of the drawing, an L-shaped angular portion 10, a continuous flange 11 extending from the short side of the L-shaped member 10 for securing the frame to another part of the aircraft or other body, and a continuous guide member 12 also integral with the member 10 for retaining the inspection door or cover for the opening. The inherent rigidity of the frame which distinguishes it from previous attempts to construct a frame suitable for the purposes disclosed, may be directly attributed to the formation of the frame from a solid piece of metal either by extrusion or other well known process whereby the flange 11 and the guide member 12 are integral with the member 10 so as to serve as stiffening and bracing members to the frame in addition to their normal functions.

Since other features of the invention relate to the adaptation of the standard frame section described above to practical uses, it is thought that a more complete understanding of the invention will be had from a detailed description of such an adaptation. In Figs. 1 to 5 of the drawing, A represents the surface covering of the particular aircraft part or other body in connection with which it is desired to use my improved frame, B is a member such as a fabric patch to which the frame is directly secured, C represents the frame, and D the inspection door or cover for the access opening.

To form the frame C a straight strip of the stock material of proper length formed as above described, is bent to the shape of the desired opening and the abutting ends are secured together in a manner to be hereinafter fully described. In case the frame is to be used with a patch B of fabric or other material as shown in Figs. 1 to 5, the flange 11 is turned down against the material and perforated at spaced intervals around its periphery so that the frame may be secured to the member B by the cord stitches 20 or as an alternative construction if desired by the use of wire staples, as shown at 23. By turning the flange 11 down against the surface of the material B, the frame forms a smooth joint with the surface to which it is attached so as to offer small resistance to air flow over the surface, and at the same time provides a space 21 between the material B and the surface A for the underside of the stitches 20 so that the material B may be applied smoothly to the wing or other surface A. The opening formed by the frame C coincides with an opening of similar dimensions in the patch B and the surface A so that when the patch is applied to the surface, access may be had through the opening formed by the frame C to the interior of the aircraft or other body for purposes of inspection or repair. Since the frame C is secured to the member B before the latter is applied to the surface A, the frame C may be used repeatedly by simply sewing it to new patches. This is an advantage when consideration is given to the great amount of inconvenience encountered due to the use of previous types of frames at times of surface repair or during periodical overhauling and re-covering of the wings or other body of an airplane.

The material from which the frame C is constructed has been described as comprising a continuous guide member 12 integral with the L-shaped portion 10. It will be seen that after the frame has been shaped to conform to the dimensions of the desired opening, the portions of the member 12 which are not required to retain the door or cover for the opening may be cut away. Thus, in the modification shown in Figs. 1 to 5 of the drawing, the part of the member 12 extending around the back and part way along the sides of the opening has been allowed to remain as it was formed when the frame material was made, while the remainder, except for the portions which have been trimmed down to constitute the lips 30 for holding the door D closed, has been entirely cut away. In like manner, the frame material is adaptable for use in long straight or curved sections, as guides for retaining narrow windows or doors at wing hinge joints, or in connection with baggage or other openings in the sides of the body, or in the wings, or engine cowling of an airplane.

The abutting ends of the frame C are secured together by means of the hollow rivets 41 passing through alined holes in the ends of the frame C and in both sides of the channel section 40, which also serve to fasten the ends 43 and 44 of springs with respect to the frame. These springs are slightly smaller in width than the size of the opening between the members 10 and 12 of the frame so as to move freely in the channel formed between those members. In order to obtain a snug joint between the ends of the frame C, the sides of the abutting L-shaped members 10 of the frame material underlying the channel section 40 should be cut away to allow for the thickness of the inner ends 43 and 44 of the spring members. The opposite ends 45 and 46 of the spring members are in direct contact with the edge 47 of the door D so that the force exerted by the springs against the door serves to hold the opposite edge of the door in engagement with the lips 30. All that it is necessary to do to open the door D is to press the same in the direction shown by the arrows at point 48 against the force of the ends of the springs 45 and 46 until the edge 49 of the door clears the lips 30. The edges 49 of the door may then be lifted out over the tops of the lips and entirely withdrawn from the frame. The reverse procedure replaces the door. The door is inserted beneath the guide members 12 and pressure is applied against the force of the springs 45 and 46 until the edge 49 of the door may be inserted beneath the lips 30. The force of the springs then retains the door in closed position until it is desired to remove it again as described above. The door may thus be opened or entirely removed from the frame and replaced and secured in position by the use of the fingers alone without the necessity for a tool or implement of any kind.

In an adaptation of my improved frame such as shown in Figs. 1 to 5, the frame C is rigid enough to support a door D of transparent material which has the advantage that an inspection sufficient for some purposes may be made of the interior of the wing or other body through the door itself. Satisfactory use of transparent material for such a door has not been possible in the past due to the fact that previous types of frames have been subject to distortion and loss of utility under ordinary conditions of service. The present frame, as stated above, has an inherent rigidity sufficient to resist deformation and retain its functions throughout the life of the airplane or other structure in connection with which it is used.

Figs. 6 and 7 show a modification in which the surface A of the aircraft wing or other body is composed of sheet metal or the like, in which case the frame C is secured directly to the material by rivets 22 or other fastening devices. In this case, the stock material is used as originally formed and since the surface covering A will now be approximately the same thickness as the guide member 12, a flush joint will be formed which offers no additional resistance to air flow over the surface. In an application of my improved frame to a body covered with sheet metal as would be the case in many modern types of airplanes, the inherent rigidity of the frame also serves to stiffen the surface to which it is attached and provides a protection for the edges of material of which the surface is composed.

The manner in which the present frame lends itself to assembly results in a saving in the cost of construction and also in a saving in weight of the parts which is always a consideration of major importance in aircraft construction. The combined fastening device for securing the ends of the frame together and for securing the spring means for holding the door of the opening closed also results in a saving in the cost of additional parts and in weight considerations. By concealing the means for holding the door closed entirely within the frame, there are no projections to increase the air resistance over the surface, and since the device is self-contained, there are no loose parts to become displaced or lost.

It is thought that the full nature and manner of operation of my invention will be apparent from the description which has been given of an acceptable embodiment thereof. However, I wish it to be understood that I do not desire to be limited to the exact details shown and described, for the reason that modifications coming within the scope of the appended claims will occur to persons skilled in the art to which the same appertains.

I claim as my invention:

1. In airplane construction, the combination with a surface covering having an inspection opening therein, and a frame comprising an angular main portion, a continuous flange by which said frame is attached to the edges of said covering around such opening, and guide members forming channel sections with the angular main portion of said frame at opposite sides thereof, of a door for closing said opening, the said door being movable in said oppositely disposed channel sections from a position in which it is engaged by the sections on both sides of said frame and is maintained closed, to a position in which it is no longer engaged by both of such sections and is free to be removed, the said frame being adapted to form a smooth joint with said surface covering so as to offer small resistance to airflow thereover.

2. In airplane construction, the combination with a surface covering having an inspection opening therein, and a frame comprising an angular main portion, a continuous flange by which said frame is attached to the edges of said surface covering around such opening, and guide members forming channel sections with the angular main portion of said frame at opposite sides thereof, the said channel sections being relatively deep on one side of said frame and relatively shallow on the other side of said frame, of a door for closing said opening, the said door being movable in said oppositely disposed channel sections from a position in which it is engaged by the sections on both sides of said frame and is maintained closed, to a position in which it is no longer engaged by the relatively shallow sections on one side of said frame and is free to be removed therefrom.

3. In airplane construction, the combination with a surface covering having an inspection opening therein, and a frame comprising an angular main portion, a continuous flange by which said frame is secured to the edges of said surface covering around such opening to form a relatively smooth joint therewith, and guide members forming channel sections with the angular main portion of said frame at opposite sides thereof, of a spring member in one of said sections, and a door for closing said opening, the said door being movable in said oppositely disposed channel sections against the force of said spring member from a position in which the said door is engaged by the sections on both sides of said frame and is maintained closed by the action of said member, to a position in which it is no longer engaged by both of such sections and is free to be removed from said frame.

4. In aircraft construction, the combination with a surface covering having an inspection opening therein, and a frame comprising an angular main portion, a flange by which said frame is secured to the edges of said covering around such opening so as to form a smooth joint therewith, guide members forming channel sections with the angular main portion of said frame at opposite sides thereof, the said channel sections being relatively deep on one side of said frame and relatively shallow on the other side of said frame, and means for securing the ends of said frame together, of a spring member in the relatively deep sections on one side of said frame, and a door for closing said opening, the said door being movable in said oppositely disposed channel sections against the force of said spring member from a position in which it is engaged by the sections on both sides of said frame and is maintained closed by the action of said member, to a position in which it is no longer engaged by the relatively shallow sections on the other side of said frame and is free to be removed therefrom.

5. In aircraft construction, the combination with a surface covering having an inspection opening therein, and a frame comprising an angular main portion, a flange by which said frame is secured to the edges of said covering around such opening so as to form a smooth joint therewith, guide members forming channel sections with the angular main portion of said frame at opposite sides thereof, the said channel sections being relatively deep on one side of said frame and relatively shallow on the other side of said frame, and means for securing the ends of said frame together, of a spring member in the relatively deep sections on one side of said frame, and a door for closing said opening, the said door being movable in said oppositely disposed channel sections against the force of said spring member from a position in which it is engaged by the sections on both sides of said frame and is maintained closed by the action of said member, to a position in which it is no longer engaged by the relatively shallow sections on the other side of said frame and is free to be removed therefrom, the said means for securing the ends of the frame together being also adapted to secure said spring member to said frame.

6. In aircraft construction, the combination with a surface covering having an inspection opening therein, a patch adapted to be secured to said surface covering about said opening, and a frame comprising an angular main portion, a continuous flange by which said frame is secured to the edges of said patch around such opening, and guide members forming channel sections with the angular main portion of said frame at opposite sides thereof, of a spring member in one of said sections and a door for closing said opening, the said door being movable in said oppositely disposed channel sections against the force of said spring member from a position in which it is engaged by the sections on both sides of said frame and is maintained closed, to a position in which it is no longer engaged by both of such sections and is free to be removed from said frame, the said frame being so shaped as to form a smooth joint with said patch so as to offer small resistance to airflow over said surface.

7. In aircraft construction, the combination with a surface covering having an inspection opening therein, a patch adapted to be secured to said surface covering about said opening, and a frame comprising an angular main portion, a continuous flange by which said frame is secured to the edges of said patch around such opening, and guide members forming channel sections with the angular main portion of said frame at opposite sides thereof, of a spring member in one of said sections and a door for closing said opening, the said door being movable in said oppositely disposed channel sections against the force of said spring member from a position in which it is engaged by the sections on both sides of said frame and is maintained closed, to a position in which it is no longer engaged by both of such sections and is free to be removed from said frame, the said frame being so shaped as to form a smooth joint with said patch so as to offer small resistance to airflow over said surface, and the said continuous flange by which said frame is secured to the edges of said covering around such opening, being perforated at spaced intervals throughout its length to permit the frame to be stitched to said surface covering, the underside of said flange being so shaped as to provide a space for such stitching and permit the patch to which the frame is stitched to be applied smoothly to said covering.

CHARLES E. HATHORN.